(12) United States Patent
Lienhart et al.

(10) Patent No.: US 9,007,573 B2
(45) Date of Patent: Apr. 14, 2015

(54) ROBOTIC SURVEYING INSTRUMENT AND METHOD FOR AN AUTOMATED COLLIMATION TELESCOPE AND SURVEYING INSTRUMENT WITH AND OBJECTIVE GOAL

(75) Inventors: Werner Lienhart, Graz (AT); Daniel Nindl, Innsbruck (AT)

(73) Assignee: Leica Geosystems AG, Heerbrugg (CH)

( * ) Notice: Subject to any disclaimer, the term of this patent is extended or adjusted under 35 U.S.C. 154(b) by 32 days.

(21) Appl. No.: 13/991,403

(22) PCT Filed: Dec. 2, 2011

(86) PCT No.: PCT/EP2011/071670
§ 371 (c)(1),
(2), (4) Date: Jun. 3, 2013

(87) PCT Pub. No.: WO2012/072811
PCT Pub. Date: Jun. 7, 2012

(65) Prior Publication Data
US 2013/0250284 A1    Sep. 26, 2013

(30) Foreign Application Priority Data
Dec. 2, 2010  (EP) ................................. 10193428

(51) Int. Cl.
  *G01B 11/26*  (2006.01)
  *G01B 11/27*  (2006.01)
  *G01C 15/00*  (2006.01)

(52) U.S. Cl.
  CPC ............ *G01B 11/272* (2013.01); *G01C 15/002* (2013.01)

(58) Field of Classification Search
  CPC .. G01B 11/27; G01B 11/272; G01B 11/2441; G01B 9/021; G01B 11/26; G01B 9/0203; G01B 9/02038; G01B 9/06; G01B 11/002; G01B 11/02; G01B 5/0009; G01C 15/002; G01C 11/02; G01C 25/00; G01C 19/38
  See application file for complete search history.

(56) References Cited

U.S. PATENT DOCUMENTS

| 3,161,715 A | 12/1964 | Davidson |
| 3,690,770 A | 9/1972 | Raith |

(Continued)

FOREIGN PATENT DOCUMENTS

| CH | 512 057 A | 8/1971 |
| CN | 101236073 A | 8/2008 |

(Continued)

OTHER PUBLICATIONS

European Search Report dated Jun. 16, 2011 as received in application No. EP 11 15 0516.

(Continued)

*Primary Examiner* — Michael P Stafira
(74) *Attorney, Agent, or Firm* — Maschoff Brennan

(57) ABSTRACT

Automated autocollimation provides alignment of a telescope of a surveying instrument. The telescope defines an optical axis perpendicular to a reflective surface of an autocollimation target, such as a coated plane mirror. Alignment is performed by a method that includes aligning the telescope with the autocollimation target and illuminating a reticle in the telescope. The telescope is focused on infinite. The autocollimation target and the illuminated reticle reflected by the reflective surface, or the illuminated reticle, are acquired using an image acquisition device in the telescope or a second telescope. The reticle center in the image is determined. The horizontal and vertical distances of the reticle center are determined from the optical axis of the telescope in the image. The horizontal and vertical distances of the reticle center are converted into horizontal and vertical aberration angles of the current alignment of the telescope from the autocollimation alignment of the telescope.

14 Claims, 9 Drawing Sheets

(56) References Cited

U.S. PATENT DOCUMENTS

| | | | |
|---|---|---|---|
| 4,653,911 A * | 3/1987 | Fortin | 356/153 |
| 5,144,479 A | 9/1992 | Aharon et al. | |
| 6,137,569 A | 10/2000 | Sasaki et al. | |
| 7,081,917 B2 | 7/2006 | Shimoyama et al. | |
| 7,342,650 B2 | 3/2008 | Kern et al. | |
| 7,835,012 B1 * | 11/2010 | Schweiger | 356/508 |
| 8,269,984 B2 | 9/2012 | Hinderling et al. | |
| 2006/0033931 A1 * | 2/2006 | Lau et al. | 356/493 |

FOREIGN PATENT DOCUMENTS

| | | |
|---|---|---|
| DE | 102 35 888 A1 | 2/2003 |
| DE | 10 2008 002 241 A1 | 12/2009 |
| EP | 0 661 519 A1 | 7/1995 |
| EP | 1 314 959 A1 | 5/2003 |
| EP | 2 053 353 A1 | 4/2009 |
| JP | 03-185310 A | 8/1991 |

OTHER PUBLICATIONS

Schlüter et al., "Selbstkalibrierung motorisierter Digitalkameratheodolite für technische Präzisionsmessungen", zfv, Jan. 2009, pp. 22-28.

\* cited by examiner

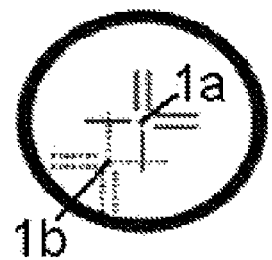
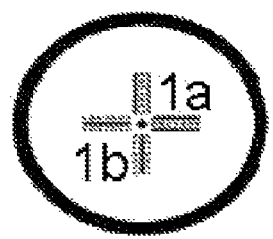
Fig. 3a  Fig. 3b
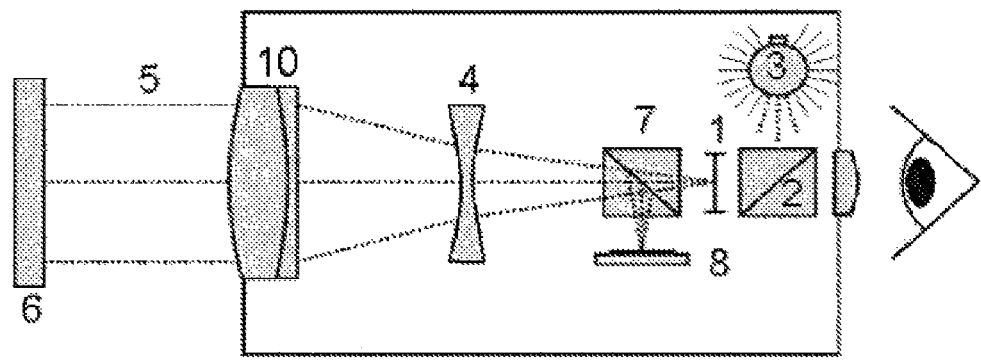
Fig. 4

ROBOTIC SURVEYING INSTRUMENT AND METHOD FOR AN AUTOMATED COLLIMATION TELESCOPE AND SURVEYING INSTRUMENT WITH AND OBJECTIVE GOAL

FIELD OF THE INVENTION

The invention relates to a robotic surveying instrument and a method for determining a spatial alignment of an autocollimation target having a reflective surface or for the autocollimation of a telescope of the surveying instrument with the target.

BACKGROUND

As is known, a method referred to as autocollimation serves firstly to determine an inclination of an autocollimation target and secondly to determine an orientation of the autocollimation target. The term inclination usually denotes a deviation of a vertical angle from a desired position, while the term orientation denotes a deviation of a horizontal angle from the desired position.

A plane mirror is usually used as an autocollimation target, said mirror being fitted to an object whose inclination and orientation are to be determined. The object can be e.g. components which are to be connected exactly to other components in a production plant. One example is motor vehicle doors, which, in a production plant, have to be aligned very precisely for incorporation in a motor vehicle body, in order to be able to be fitted in exactly, without stoppages of the assembly line occurring.

A second purpose of an autocollimation process is to produce an optical reference line that is perpendicular to the autocollimation target. In this case, it is necessary, instead of the target itself, to set up the telescope used for autocollimation such that the optical axis of said telescope is precisely perpendicular to the autocollimation target.

Hitherto, such an autocollimation has been carried out manually. For this purpose, a telescope, the construction of which can be seen schematically from FIG. 1, is aligned in the direction of the autocollimation target. Next, the telescope is set to "infinity" by a displacement of a focus lens 4 arranged movably on the optical axis of the telescope.

The user is then able to identify a reticle 1, which is illuminated by means of an illumination device 3 via a beam splitter 2, and the mirror image of said reticle, said mirror image being reflected at the autocollimation target 6, in the image plane. In the ideal case where the autocollimation target 6 is aligned precisely perpendicularly with respect to the optical axis of the telescope, the reticle 1 and the mirror image thereof coincide, and no further measures are necessary.

FIG. 2 schematically reveals a case in which the autocorrelation target is not aligned precisely perpendicularly with respect to the optical axis of the telescope. Here, the user discerns a deviation between the reticle 1a and the mirror image 1b thereof, which deviation is dependent on the inclination and the orientation of the autocollimation target 6 and is illustrated by way of example in FIG. 3a. In order to correct the deviation, the user changes the horizontal angle and the vertical angle of the telescope until the reticle and the mirror image thereof coincide, as is illustrated in FIG. 3b. The inclination and the orientation of the autocollimation target are then determined from the horizontal and vertical angles of the telescope. FIG. 2 reveals a case in which a vertical inclination angle of the autocollimation target is $\alpha$. A reflection angle at which the light beams 5 are reflected is accordingly $2 \times \alpha$. An illustration of the horizontal deviation in FIG. 2 has been dispensed with, for reasons of simplified illustration.

In order to cause the optical axis of the telescope to be incident on the autocollimation target perpendicularly, it is therefore necessary either to rotate the telescope by a in the vertical direction, or to rotate the autocollimation target by the angle $\alpha$ in the vertical direction. An analogous rotation of the telescope or of the autocollimation target in the horizontal direction then has the effect that the optical axis of the telescope is perpendicular to the autocollimation target.

FIG. 3a illustrates an incomplete reticle 1a. A reflection of the reticle 1 by a mirror fitted to the autocollimation target leads to a mirror image 1b of the reticle 1a. The adjustment of the telescope or of the autocollimation target as described in the previous paragraphs results in a displacement of the mirror image until the reticle 1a with precise, perpendicular alignment with the autocollimation target 6 together with its mirror image 1b produces the image of a complete reticle, as illustrated in FIG. 3b.

There is a need for a telescope with which an autocollimation can be carried out automatically, and for a method for automatically carrying out an autocollimation.

SUMMARY

A telescope according to the invention is provided for use in a surveying instrument. The telescope comprises a light source, a reticle, which can be illuminated by the light source, and a first beam splitter. The beam splitter is arranged at a proximal end of the telescope in order to deflect light beams emitted by the light source along the optical axis of the telescope. A focus lens, which is movable to and fro along the optical axis, is arranged at a distal end of the telescope. That end of the telescope which faces the target is designated as the distal end of the telescope. The end facing away from the target or an eyepiece of the telescope is designated here as the proximal end.

Moreover, a second beam splitter is arranged between the first beam splitter and the movable focus lens, said second beam splitter being designed to deflect light beams reflected from an autocollimation target to a deviation determining device, by which a deviation of the light beams from the optical axis of the telescope can be determined.

On account of the deviation determining device, it is advantageously possible to automatically identify whether the light beams emitted to the autocollimation target, in particular a light beam emitted along the optical axis of the telescope, are reflected in a manner not parallel to or not along the optical axis. By determining the deviation, it is thereupon possible to determine an inclination and an orientation of the autocollimation target.

Light beams within the meaning of the invention can also be laser beams. If laser beams are used, the illuminated reticle can be omitted.

Preferably, the light beams reflected from the autocollimation target can be deflected to an image acquisition device. The deviation of the light beams from the optical axis of the telescope can then be determined from an image acquired by the image acquisition device.

Advantageously, the telescope can additionally have an interface for communication with an external device. Examples of external devices include a PC, a portable computer, a cell phone, a PDA. The interface can be e.g. a wire connection, a WLAN connection, a Bluetooth connection or an infrared connection.

Preferably, the illuminatable reticle can be arranged on the optical axis of the telescope between the first beam splitter and the movable focus lens and/or between the first beam splitter and the second beam splitter.

Alternatively, the illuminatable reticle can be arranged between the light source and the first beam splitter, and a second reticle can be arranged between the proximal end of the telescope and the first beam splitter.

Preferably, the illuminatable reticle and the second reticle can be embodied incompletely. In this case, the illuminatable reticle can be completed by its mirroring about the horizontal and/or the vertical axis and/or by the second reticle and/or a mirroring of the second reticle about its horizontal and/or vertical axis. A user can thus discern that the optical axis of the telescope is perpendicular to the autocollimation target if the reticle is fully discernible.

In particular, the above-described telescope according to the invention is part of a surveying instrument, in particular of an industrial surveying theodolite or of an industrial surveying total station. In this case, the surveying instrument—according to the generic type, that is to say as known to the person skilled in the art—can comprise a base, which can be mounted in particular onto a stand, an upper part mounted on the base in a manner rotatable about a rotation axis, and the telescope mounted on the upper part in a manner pivotable about a pivoting axis. Moreover, an evaluation and control unit can be present.

In this case, the spatial alignment of the sighting unit relative to the base can be acquired via two goniometers and moreover—depending on the development stage of the surveying instrument—a first and a second rotary drive can make the upper part and/or the telescope drivable and alignable. Moreover, a distance measuring functionality can also be ensured by the telescope.

According to the invention, the surveying instrument can now have an autocollimation functionality which proceeds at least partly automatically after initiation and in the context of which the method described in greater detail below (namely the method for autocollimation, as alignment of the telescope defining an optical axis in such a way that the optical axis is perpendicular to a reflective surface of an autocollimation target, in particular of a coated plane mirror) can be carried out in a manner controlled automatically by the evaluation and control unit.

The method for autocollimation according to the invention comprises the following steps:
 a) aligning a telescope with an autocollimation target;
 b) illuminating a reticle in the telescope;
 c) focusing the telescope at infinity;
 d) acquiring the autocollimation target and the illuminated reticle reflected from the latter or the illuminated reticle by means of an image acquisition device;
 e) determining the reticle center point in the image;
 f) determining the horizontal and the vertical distance of the reticle center point from the optical axis of the telescope in the image;
 g) converting the horizontal and the vertical distance of the reticle center point into a horizontal and a vertical deviation angle.

The designation of all activities effected in the context of the method according to the invention as step a), step b), etc. in this case in no way implies that these activities are carried out in a manner that necessarily has to be effected separately. Moreover, the naming of the steps with a), b), etc. does not necessarily demand a specific order for carrying out the activities. By contrast, in the context of the method according to the invention, the activities designated as steps a), b), etc. can also be carried out in combination and/or collectively (that is to say jointly, simultaneously or with a temporal overlap). Moreover, the activities of the method that are effected according to the invention (which are designated as "steps" here merely for administrative reasons) can also be carried out in a different order than that arranged above. Purely by way of example—as is clear to the person skilled in the art—for instance the illumination of the reticle can also be effected over an extensive, in particular the entire, period of time in which the method is carried out, or—likewise purely by way of example—the focusing of the telescope can also be carried out either before, after or during the step of aligning the telescope with the autocollimation target (or else in part with a temporal overlap).

In accordance with the method for autocollimation according to the invention, it is now possible to automatically detect whether the optical axis of the telescope is perpendicular to an autocollimation target. From the horizontal and vertical distances of the reticle from the optical axis in the image, on the basis of a preceding calibration of the telescope or of a surveying instrument comprising the telescope, it is possible to determine an inclination and an orientation of the autocollimation target.

Advantageously, the method according to the invention can comprise the following additional steps:
 h) movement of the telescope by half of the horizontal and of the vertical deviation angle in order that the optical axis of the telescope is perpendicular to the autocollimation target,
 i) measurement of the horizontal angle and of the vertical angle of the telescope,
 j) calculation of the inclination angle and of the orientation angle of the target from the measured horizontal angle and vertical angle.

By applying these additional method steps, the telescope is aligned such that its optical axis is perpendicular to the autocollimation target.

Alternatively, the method according to the invention can comprise the following additional steps:
 i2) measuring the horizontal angle and the vertical angle of the telescope,
 k) determining the inclination angle and the orientation angle of the target by adding half the horizontal and half the vertical deviation angle to the measured horizontal angle and vertical angle of the telescope.

It is thereby possible, in a simple manner, to determine the inclination angle and the orientation angle of the autocollimation target, without the need to move the telescope.

Advantageously, in one of the methods mentioned above, the optical axis can correspond to the image center point. The determination of the horizontal and of the vertical distance of the reticle center point from the optical axis of the telescope in the image can be determined from the number of pixels between the reticle center point and the optical axis.

Advantageously, there is the possibility of carrying out the steps proceeding from step e) in an iterative manner until the horizontal and the vertical deviation angle lie below a predetermined threshold value.

Advantageously, there is additionally the possibility of carrying out steps a), c) and d) by means of automatically tracing a predetermined search pattern by an automatic rotation of the telescope. In this case, the focus lens can be automatically focused and the target can be identified by a comparison of the acquired image with a predefined comparison image.

The comparison image used in this case can be a view of the surveying instrument with the telescope, such as can be discerned in a mirror fitted to the autocollimation target, if the optical axis of the telescope is perpendicular to the mirror or to the autocollimation target. However, alternatively it is also possible to use other reference images as comparison images, e.g. a distinctive sign arranged on the telescope or a marking (code mark) adhesively applied to the surveying instrument especially for this purpose.

Advantageously, it is possible to move the target in accordance with the horizontal and the vertical deviation angle in such a way that it is perpendicular to the optical axis of the telescope. Exact adaptation of the autocollimation target to the optical axis of the telescope is thereby possible.

In particular, the method can also be performed such that a second telescope with an on axis camera (OAC) serves as the target, and in step f) the horizontal and the vertical distance of the reticle center point from the optical axis of the second telescope in the image are determined as a basis for the following steps.

In particular, it is then also possible for one of the telescopes to be moved by the horizontal and the vertical deviation angle, or both telescopes can be moved by in each case half the horizontal and half the vertical deviation angle. For control and mutual coordination of the collimation process, both telescopes (or both surveying instruments) can be connected e.g. to an external, common control and supervisory device. Alternatively, the two instruments can also be designed in such a way that they can communicate with one another (e.g. via a radio link)—for the purpose of controlling the automatic mutual collimation process. In this case, the process can proceed automatically without a further external control and supervisory device. By way of example, one of the two instruments as "master instrument" can perform the automatic control of the mutual collimation process (that is to say the control of both instruments) and the other instrument then as "slave" can merely perform the control commands derived from the acquired image in each case on the part of the master instrument.

It is thereby possible to align two telescopes with one another such that their optical axes either lie parallel or even coincide exactly. This process is also designated as mutual collimation.

In summary, the present invention relates to the following subjects of the invention:

A) Method 1:

A method for determining a spatial alignment of an autocollimation target having a reflective surface, in particular a coated plane mirror, with a telescope of a robotic surveying instrument, said telescope defining an optical axis, wherein the surveying instrument has a base and an upper part mounted on the base in a manner rotatable about a rotation axis in a motorized manner, and wherein the telescope is mounted on the upper part in a manner pivotable about a pivoting axis in a motorized manner, comprising a) aligning the telescope with the autocollimation target;
b) illuminating a reticle in the telescope, in particular wherein at least one region directly surrounding the reticle is illuminated substantially uniformly;
c) focusing the telescope at infinity;
d) acquiring a mirror image—generated at the reflective surface—of the illuminated reticle by means of an electronic image acquisition device arranged in the telescope;
e) determining the reticle center point of the acquired mirror image of the illuminated reticle in the image;
f) determining the horizontal ($\Delta px$) and the vertical ($\Delta py$) distance of the reticle center point from a predetermined pixel position, in particular the pixel position of the optical axis, in the image;
g) converting the horizontal ($\Delta px$) and the vertical ($\Delta py$) distance of the reticle center point into a horizontal ($\Delta H$) and a vertical ($\Delta V$) deviation angle of the current alignment of the telescope from an alignment of the telescope that is perpendicular to the reflective surface of the autocollimation target; and
k) determining the spatial alignment of the autocollimation target on the basis of the horizontal ($\Delta H$) and the vertical ($\Delta V$) deviation angle.

In this case, developments of method 1 constitute, inter alia, the following features that for determining the spatial alignment of the autocollimation target (as step i2)) the horizontal angle (H) and the vertical angle (V) of the telescope are measured, and the spatial alignment of the autocollimation target, in particular the inclination angle and the orientation angle, is calculated by adding half the horizontal ($\Delta H/2$) and half the vertical ($\Delta V/2$) deviation angle to the measured horizontal angle (H) and vertical angle (V), respectively, of the telescope.

that after step g) the following are carried out
  h2) motorized movement of the autocollimation target depending on the horizontal ($\Delta H$) and the vertical ($\Delta V$) deviation angle in such a way that the optical axis is perpendicular to the autocollimation target,
  i) measurement of the horizontal angle (H) and the vertical angle (V) of the telescope, and
  j) calculation of the inclination angle and the orientation angle of the autocollimation target from the measured horizontal angle (H) and vertical angle (V).

that for determining the spatial alignment of the autocollimation target, an autocollimation, as alignment of the telescope in such a way that the optical axis is perpendicular to the reflective surface of the autocollimation target, is effected, wherein in detail the following are carried out
  h) motorized movement of the telescope relative to the base depending on the horizontal ($\Delta H$) and the vertical ($\Delta V$) deviation angle in such a way that the optical axis is perpendicular to the autocollimation target,
  i) measurement of the horizontal angle (H) and the vertical angle (V) of the autocollimated telescope, and
  j) calculation of the inclination angle and the orientation angle of the autocollimation target from the measured horizontal angle (H) and vertical angle (V).

that for autocollimation after step g) as step $_{pre}$h) the telescope is moved by half of the horizontal ($\Delta H/2$) and of the vertical ($\Delta V/2$) deviation angle and steps d) to $_{pre}$h) are carried out repeatedly in an iterative manner until the horizontal and the vertical deviation angle lie below a predetermined threshold value.

B) Method 2:

A method for determining a mutual spatial alignment of
  a first telescope of a first surveying instrument, said first telescope defining a first optical axis,
relative to
  a second telescope of a second surveying instrument, said second telescope defining a second optical axis,
wherein the first and second surveying instruments each have a base and an upper part mounted on the base in a manner rotatable about a rotation axis in a motorized manner and the first and second telescopes, respectively, are mounted on the respective upper part in a manner pivotable about a pivoting axis in a motorized manner, comprising a) coarsely aligning the first and second telescopes in such a way that the latter mutually face one another;

b) illuminating a reticle in the first telescope, in particular with a substantially uniform illumination of a region encompassing the reticle;

c) focusing the first and second telescopes at infinity;

d) acquiring the illuminated reticle by means of an electronic image acquisition device arranged in the second telescope;

e) determining the reticle center point of the acquired reticle in the image;

f) determining the horizontal ($\Delta px$) and the vertical ($\Delta py$) distance of the reticle center point from a predetermined pixel position, in particular the pixel position of the second optical axis, in the image;

g) converting the horizontal ($\Delta px$) and the vertical ($\Delta py$) distance of the reticle center point into a horizontal ($\Delta H$) and a vertical ($\Delta V$) deviation angle from the current mutual alignment of the first and second telescopes relative to one another to a mutual alignment of the first and second telescopes in such a way that the first and second optical axes run coaxially with respect to one another; and k) determining the mutual spatial alignment of the first and second telescopes relative to one another on the basis of the horizontal ($\Delta H$) and the vertical ($\Delta V$) deviation angle.

In this case, a development, of method 2 constitutes, inter alia, the following features that for determining the mutual spatial alignment, an autocollimation of the first telescope with the second telescope, as alignment of the first telescope relative to the second telescope in such a way that the first and second optical axes run coaxially with respect to one another, is effected, wherein in detail the following are carried out h) motorized movement of the first and second telescopes relative to the base depending on the horizontal ($\Delta H$) and the vertical ($\Delta V$) deviation angle in such a way that the first and second optical axes run coaxially with respect to one another, in particular wherein both the first and the second telescope are moved in a motorized manner by respectively half ($\Delta H/2$) the horizontal and half the vertical ($\Delta V/2$) deviation angle, i) measurement of the horizontal angle (H) and of the vertical angle (V) of the first telescope and of the horizontal angle (H) and of the vertical angle (V) of the second telescope, and j) calculation of the mutual spatial alignment from the measured horizontal (H) and vertical angles (V).

C) Device 1:

A robotic surveying instrument, in particular an industrial surveying theodolite or industrial surveying total station, for use in the context of the method 1 (see point A)), comprising a base, an upper part mounted on the base in a manner rotatable about a rotation axis in a motorized manner, a telescope mounted on the upper part in a manner pivotable about a pivoting axis in a motorized manner, said telescope defining an optical axis, and an evaluation and control unit, wherein the telescope comprises a light source, a reticle, which can be illuminated by the light source, in particular wherein the light source and the reticle are embodied and arranged relatively in such a way that at least one region directly surrounding the reticle is illuminated substantially uniformly, a first beam splitter, which is arranged at a proximal end of the telescope, in order to deflect light beams emitted by the light source along the optical axis of the telescope, a focus lens, which is movable to and fro along the optical axis, wherein according to the invention the telescope comprises a coaxial image acquisition device for acquiring an image from a mirror image of the illuminated reticle, said mirror image being generated at a reflective surface of an autocollimation target, and the evaluation and control unit is designed for automatically controlling or carrying out the steps proceeding from step b) of the method 1 (see point A)), such that the surveying instrument has a collimation target alignment determining or autocollimation functionality which proceeds at least partly automatically after initiation.

In this case, developments of device 1 constitute, inter alia, the following features:

that a second beam splitter for coupling a secondary beam path of the image acquisition device into a main beam path of the telescope is provided between the first beam splitter and the movable focus lens.

that the illuminatable reticle is arranged in the main beam path between the first beam splitter and the movable focus lens and/or between the first beam splitter and the second beam splitter.

that the illuminatable reticle is arranged between the light source and the first beam splitter, and a second reticle is arranged in the main beam path between the proximal end of the telescope and the first beam splitter.

that the illuminatable reticle and, if appropriate, the second reticle are embodied asymmetrically, in particular in such a way that the illuminatable reticle (1) in the image together with its mirroring about the horizontal and/or the vertical axis complement one another to form a symmetrical overall arrangement or that the second reticle (9) in the image together with a mirroring of the illuminatable reticle (1) about the horizontal and/or the vertical axis complement one another to form a symmetrical overall arrangement.

D) Device 2:

A surveying system comprising a first and a second robotic surveying instrument, for use in the context of the method 2, wherein the first robotic surveying instrument comprises a base, an upper part mounted on the base in a manner rotatable about a rotation axis in a motorized manner, and a first telescope mounted on the upper part in a manner pivotable about a pivoting axis in a motorized manner, said first telescope defining a first optical axis, comprising a light source, a reticle, which can be illuminated by the light source, in particular wherein the light source and the reticle are embodied and arranged relatively in such a way that at least one region directly surrounding the reticle is illuminated substantially uniformly,
a first beam splitter, which is arranged at a proximal end of the telescope, in order to deflect light beams emitted by the light source along the optical axis of the telescope,
a focus lens, which is movable to and fro along the optical axis,
and wherein the second robotic surveying instrument comprises
a base,
an upper part mounted on the base in a manner rotatable about a rotation axis in a motorized manner, and
a second telescope mounted on the upper part in a manner pivotable about a pivoting axis in a motorized manner, said second telescope defining a second optical axis, comprising a focus lens, which is movable to and fro along the optical axis,
wherein the invention provides
a coaxial image acquisition device for acquiring an image of the illuminated reticle, this device being provided in the second telescope, provided that the first and second telescopes are mutually at least coarsely aligned in such a way that they mutually face one another, and
an evaluation and control unit for automatically controlling or carrying out the steps proceeding from step b) of the method 2, such that the surveying system has a functionality—proceeding at least partly automatically after initiation—for determining the mutual spatial alignment of the first and second telescopes relative to one another or for the mutual autocollimation of the first and second telescopes relative to one another.

BRIEF DESCRIPTION OF THE DRAWINGS

Further features and advantages of the invention will become apparent from the following description, which should be read together with the appended figures, in which:

FIGS. 3a-b are views of a split reticle in which the autocollimation target is misaligned and, respectively, perpendicular to the optical axis of the telescope;

FIG. 4 schematically shows a sectional view of a telescope for autocollimation in accordance with one embodiment of the invention;

DETAILED DESCRIPTION

Figure 1:
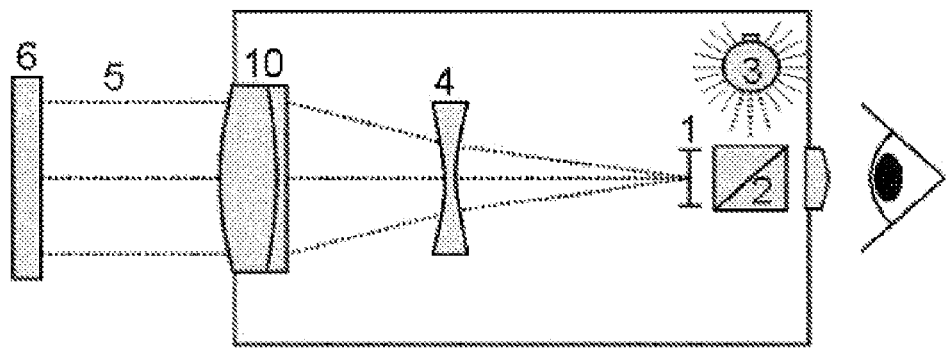
FIG. 1 schematically shows a sectional view of a telescope used for autocollimation in accordance with the prior art.
Figure 2:
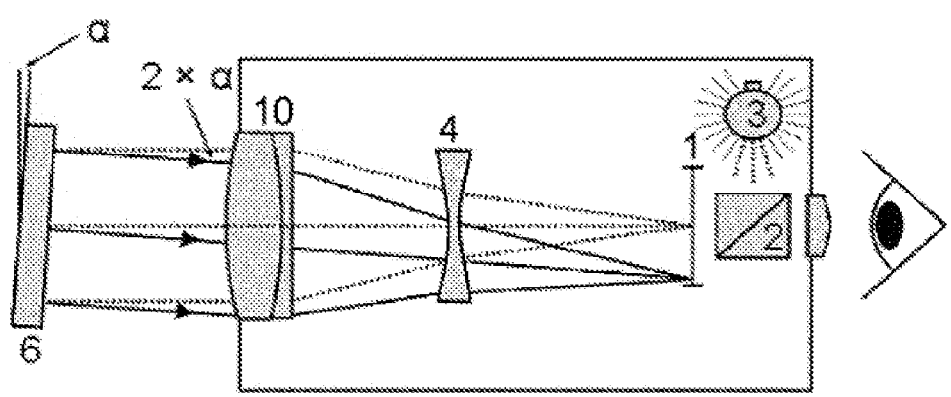
FIG. 2 schematically shows a sectional view of the telescope from FIG. 1 in the case of a misalignment of an autocollimation target.

Currently preferred embodiments of the invention will be described with FIGS. 4 to 10.

FIG. 4 shows a telescope in accordance with one embodiment of the invention, which telescope is used on a surveying instrument (instrument hereinafter). At a proximal end of the telescope, which is arranged on the right in the drawing, a beam splitter 2 is situated on the optical axis of the telescope. The beam splitter serves for deflecting light beams of an illumination device 3, which is arranged near the beam splitter 2, along the optical axis of the telescope in the direction of a distal end of the telescope.

The illumination device 3 can be embodied in various ways. By way of example, it can be fitted to the telescope in a demountable manner in the form of a plug-on solution, but it can also be fixedly integrated into the telescope.

The light beams deflected by the beam splitter 2 along the optical axis of the telescope serve for illuminating a reticle 1 arranged between the beam splitter 2 and a second beam splitter 7. A focus lens 4, which is displaceable along the optical axis, is situated downstream of the second beam splitter 7. By means of a displacement of the focus lens 4 into an "infinity position", the light beams 5, in combination with a converging lens 10 fitted at the distal end of the telescope, are aligned exactly parallel to the optical axis and are incident on an autocollimation target 6 or on a mirror 6 fitted thereto.

The light beams 5 are reflected from the mirror 6 so as to be focused again by the converging lens 10 and the focus lens 4 and diverted by the second beam splitter 7 onto an image sensor 8 of an on axis camera (OAC), such as e.g. a CMOS, a CCD or others, onto which an image of the reticle 1 is thus projected. The image data are transmitted to a control unit by means of an interface (not illustrated). By way of example, an integrated or external computer, a PDA or other suitable devices can be used as the control unit. The image can also be displayed on a display or a screen of the control unit.

In this case, the telescope is designed for use in the context of the method according to the invention already described above (namely the method for autocollimation, as alignment of the telescope in such a way that the optical axis is perpendicular to a reflective surface of an autocollimation target, in particular of a coated plane mirror).

Figure 5:
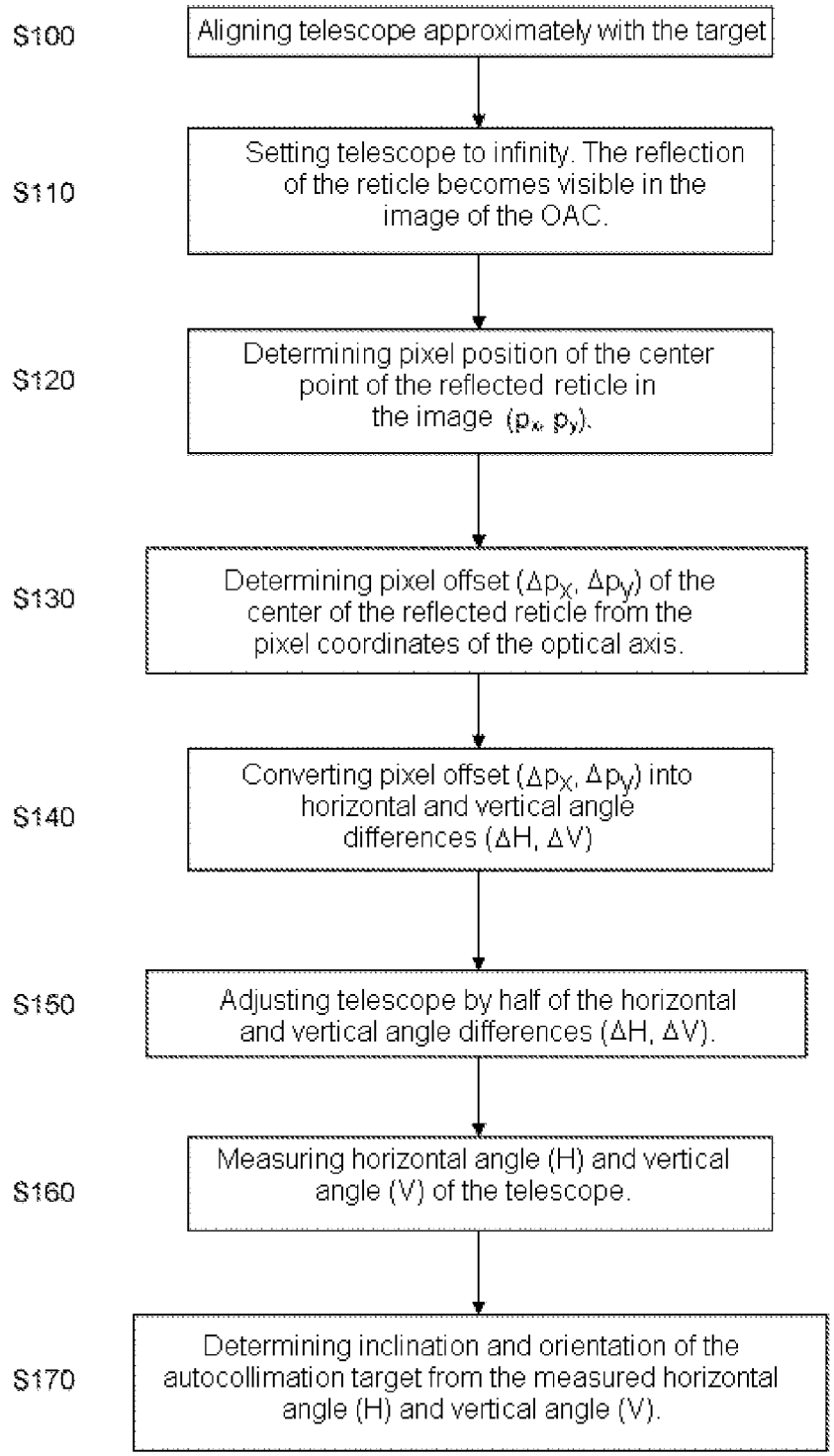
FIG. 5 shows a flowchart of an autocollimation process in accordance with one embodiment of the invention.

The flowchart in FIG. 5 illustrates the autocollimation process according to the invention which involves determining a reference line that is perpendicular to a reflective surface of an autocollimation target 6.

Firstly, in step 100 (hereinafter S100, etc.), the telescope is aligned approximately with the autocollimation target 6 by a user. The autocollimation target 6 used is, in particular, a plane mirror 6 fitted to an object whose alignment is intended to be determined or with which the telescope is intended to be aligned.

Next, in S110, the telescope is set to infinity. As a result, a mirror image of the reticle 1 becomes visible or and is visible to a user upon looking through the telescope, or can be discerned on the display or the screen of the control unit, as is evident from FIG. 6a.

Figure 6A:
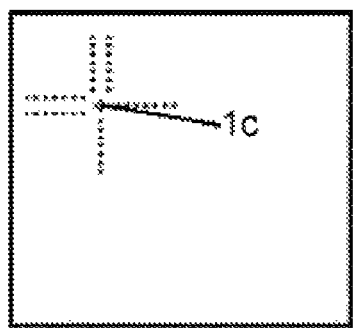
FIGS. 6a-d are different views of a reticle during the autocollimation process in FIG. 5 and FIG. 10.
Figure 6B:
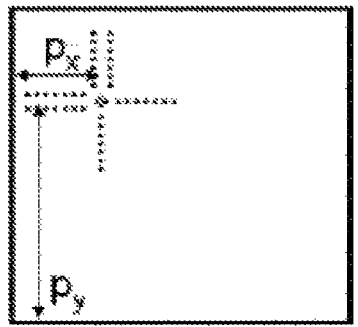

Next, in S120, the pixel coordinates $(p_x, p_y)$ of the center point 1c of the mirror image of the reticle are determined, as is evident from FIG. 6b. For this purpose there can be methods such as e.g. image processing by calculating the centroid of the reticle, image comparison with stored patterns (pattern recognition) or others.

Figure 6C:
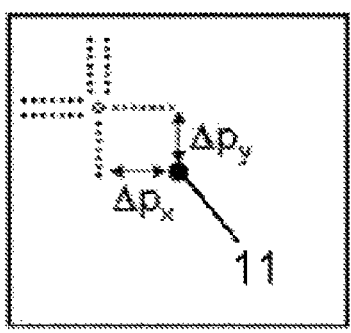
Figure 6D:
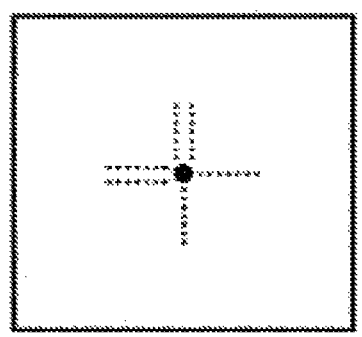

Next, S130 then involves determining the pixel offset $\Delta p_x$ and $\Delta p_y$, that is to say the distance between the pixel position 11 of the optical axis and the center point 1c of the reticle 1 in pixels, as is evident from FIG. 6c. The pixel position 11 of the optical axis is known from a preceding calibration of the telescope. Preferably, the telescope is designed such that the pixel position 11 of the optical axis is situated precisely in the center of the sensor or in the center of the image.

In S140, the pixel offset is converted into horizontal and vertical differences ΔH and ΔV. Specifically, as a result of the preceding calibration of the telescope, a transformation function is additionally known which can be used to assign specific pixel distances to a specific angle difference. Consequently, after S140, the position of the optical axis of the telescope with respect to the autocollimation target is known.

Following the determination of the horizontal and vertical angle differences ΔH and ΔV, in S150, the telescope is adjusted by half of the horizontal and vertical angle differences ΔH and ΔV, that is to say by ΔH/2 and ΔV/2, as a result of which the optical axis of the telescope is exactly perpendicular to the autocollimation target 6. As is evident from FIG. 6d, in the image the center point 1c of the reflected reticle 1 now coincides with the position of the optical axis 11. The optical axis now forms a reference line which is precisely perpendicular to the reflective surface of the autocollimation target 6. If this is not the case, the offset determined by a calibration can also be taken into account and used in the evaluation.

In accordance with one variant of this embodiment, steps 120 to 150 can also be performed repeatedly until the angle differences ΔH and ΔV determined are less than predetermined threshold values, as a result of which it is possible to achieve an even higher accuracy when determining the reference line (that is to say a smaller residual deviation from the "ideal" autocollimation alignment). If it is ascertained, for example, that after carrying out steps 120 to 150 for the first time—e.g. on account of inadequate camera calibration (for instance with regard to distortion or conversion of pixel positions into movement distances) or positioning inaccuracy after movement by ΔH/2 and ΔV/2—the reticle center point 1c does not correspond sufficiently precisely to the optical axis in the image (or the two reticles do not yet correspond sufficiently precisely), in further iteration passes said steps 120 to 150 can in each case be repeated until the desired/predefined residual deviation from the "ideal" autocollimation alignment is obtained. This constitutes an iterative method according to the invention.

If it is desired to determine the inclination and orientation of the autocollimation target 6, instead of aligning a reference line with the autocollimation target 6, perpendicularly, in S170 the inclination and orientation of the autocollimation target 6 are determined from the horizontal angles and vertical angles H and V of the telescope that are measured in S160. In this case, the inclination angle corresponds to the vertical angle V and the orientation angle corresponds to the horizontal angle H. If the autocollimation target is moved along an object, then relative inclination changes can be derived from the absolute inclination values and said changes can be used e.g. for checking the planarity of the object.

Figure 7:
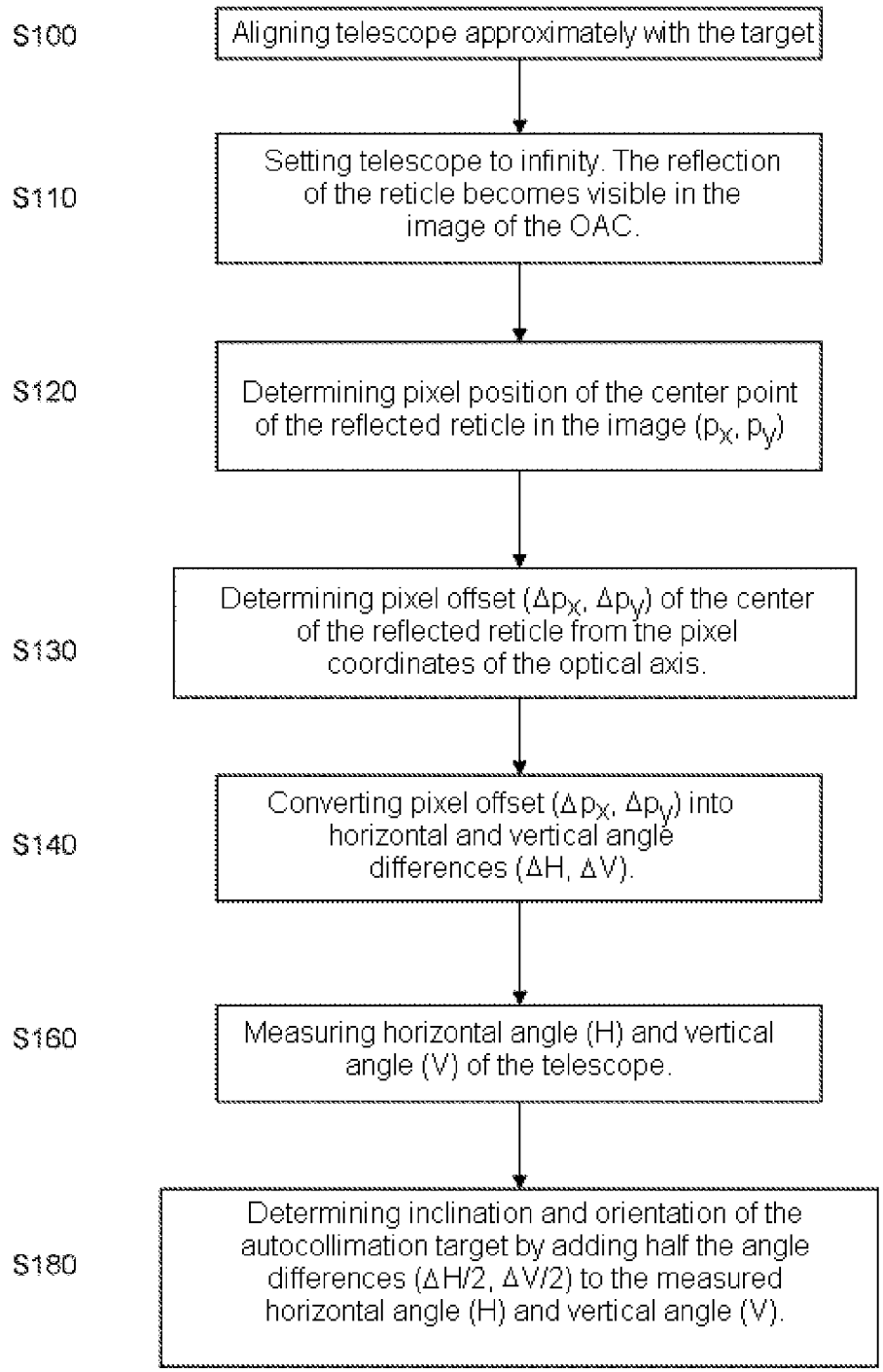
FIG. 7 shows a flowchart of an autocollimation process in accordance with another embodiment of the invention.

As an alternative to the procedure described with reference to FIG. 5, the inclination and orientation can also be determined on the basis of the procedure illustrated in FIG. 7. The procedure is identical to steps 100 to 160 in FIG. 5, although S150 is omitted, that is to say that it is not necessary to move the telescope. Instead, in S180, half the angle differences ΔH/2 and ΔV/2 are added to the horizontal and vertical angles H and V measured in S160 and the inclination and the orientation of the autocollimation target 6 are thus determined.

The automation affords advantages, inter alia, since an autocollimation process can be carried out more rapidly than by means of the methods mentioned in the prior art.

Moreover, an autocollimation process can be regularly repeated automatically, which leads to simplifications with regard to monitoring a production sequence. For such an application the use of the known method will be too costly in terms of personnel and too time-consuming.

Since the method is automated, sources of errors resulting from human users such as incorrect reading of measured values, etc. are eliminated.

If it is necessary only to determine the inclination and orientation of the autocollimation target, the step of combining the reticle 1 and its mirror image 1 or of combining the mirror image 1 of the reticle with the position 11 of the optical axis can be omitted. This results in a gain in speed.

Moreover, autocollimation processes can be carried out in environments which are hazardous to humans and are therefore not accessible or are accessible only with restrictions.

If the telescope used is provided with a motor for the adjusting movements of the telescope, and if the focus lens can likewise be moved by means of a motor, the steps that otherwise have to be carried out manually can also be carried out in an automated manner, as is evident from the table below.

Table 1 presents possible degrees of automation of different instruments. All the instruments have a camera arranged coaxially with respect to the optical axis (so-called on axis camera, OAC), and the above-described devices for automatic autocollimation.

TABLE 1

| Step | Task | Man. instrument | Motorized telescope movement | Motorized telescope movement and motorized focus lens |
|---|---|---|---|---|
| 100 | Approximate alignment with the target | Manual | Automatic | Automatic |
| 110 | Setting infinity | Manual | Manual | Automatic |
| 120 | Pixel position of the reflected reticle | Automatic | Automatic | Automatic |
| 130 | Pixel offset with respect to the optical axis | Automatic | Automatic | Automatic |
| 140 | Converting the pixel offset into angle differences | Automatic | Automatic | Automatic |
| 150 | Moving telescope | Manual | Automatic | Automatic |
| 160 | Measuring angles | Automatic | Automatic | Automatic |
| 170/180 | Determining orientation and inclination of the target | Automatic | Automatic | Automatic |

In this case, S100 can be carried automatically if the approximate position of the instrument and of the autocollimation target 6 is known. However, S100 can also be carried out in an automated manner in so far as the motorized telescope traces a predefined search pattern and the autocollimation target 6 is identified by means of image analysis. By way of example, a mirror image of the telescope reflected from the mirror fitted to the autocollimation target can serve as a comparison image.

In the case where steps 100, 110 and 150 are carried out manually, in accordance with one preferred variant it is possible to predefine the corresponding directions of movement by arrows on the display or the screen of the control unit. In this case, it is also possible to display numerical values representing the required extent of movement.

Figure 8A:
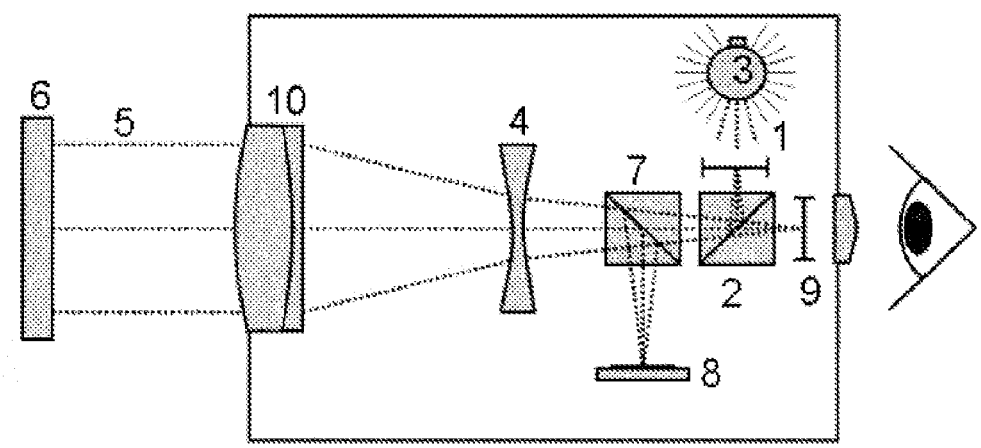
FIGS. 8a-e schematically show a sectional view of a telescope for autocollimation in accordance with a further embodiment of the invention and an exemplary configuration of the two reticles and views thereof from the camera and when viewed through the eyepiece.

FIG. 8a reveals a further embodiment of a telescope that can be used for autocollimation according to the invention. Only differences relative to the telescope illustrated in FIG. 4 are described in the following description, in order to avoid repetitions.

The illuminatable reticle 1 is arranged between the illumination device 3 and the beam splitter 2 instead of on the optical axis. Consequently, the reticle 1 is illuminated directly and the light beams 5 of the illuminated reticle 1 are deflected along the optical axis. The reflective light beams that are deflected by the second beam splitter 7 are detected by the image sensor 8 in the same way as in the embodiment in FIG. 4, and are processed further in a corresponding manner.

Figure 8B:
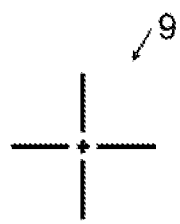
Figure 8C:
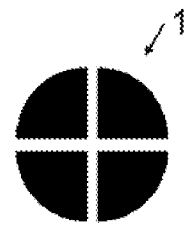

By means of a second reticle 9 (which is arranged between the proximal end or the eyepiece of the telescope and the first beam splitter 2 on the optical axis, does not have to be illuminated and can be shaped for example in accordance with the variant from FIG. 8b) correspondingly coordinated with the first reticle (which can be shaped for example in accordance with the variant from FIG. 8c), the manual autocollimation process or a visual check of the automatic autocollimation can be made possible in a facilitated or improved manner for a user.

Figure 8D:
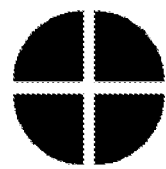

The illuminated first reticle 1 is therefore not directly viewed or captured with the aid of the camera sensor 8, rather its mirror image—reflected at the collimation mirror—is captured by the camera sensor 8 or can be viewed through the eyepiece. The user views the non-illuminated second reticle 9 directly through the eyepiece and—on account of the non-illumination—no mirror image of said second reticle 9 is visible during viewing through the eyepiece. Neither the second reticle 9 itself nor its mirror image (the latter on account of the non-illumination) is captured by the camera sensor 8 (in an explanatory manner in this respect, FIG. 8d shows an image from the point of view of the camera sensor, on which only the mirror image of the first reticle 1 appears and indeed the second reticle 9 does not appear, nor does the mirror image thereof).

The advantage of the arrangement in accordance with FIG. 8a here is that for the first reticle 1 (e.g. optimized in its form to the effect that a camera image thereof captured by means of the camera sensor 8 can be evaluated as simply and precisely as possible with the aid of image processing) and for the second reticle 9 (e.g. optimized in its form with regard to visual sighting of a target by a user)

different reticle forms can be chosen. Moreover, the two reticles can advantageously be coordinated with one another such that they complement one another in such a way that the mirror image of the first reticle 1, which can be viewed through the eyepiece on the part of the user, and the second reticle 9, which can be viewed directly, when viewed jointly make an autocollimation alignment of the telescope checkable as simply as possible and at the same time as precisely as possible on the basis of the user's visual inspection (and e.g. also manually adjustable).

Figure 8E:
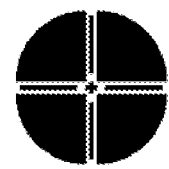

In this case, FIG. 8e shows the superimposition—which can be viewed through the eyepiece on the part of the user—of the mirror image of the first reticle and the second reticle 9 in the autocollimation alignment of the telescope.

Figure 9A:
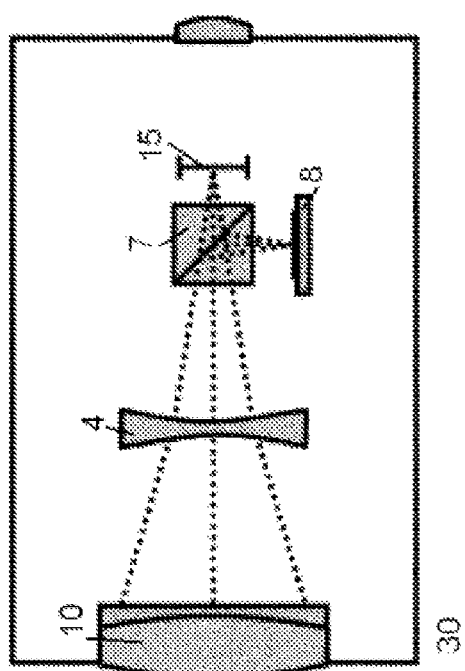
FIGS. 9a-b schematically show in each case sectional views of two telescopes which are to be aligned parallel according to the invention.
Figure 9A:
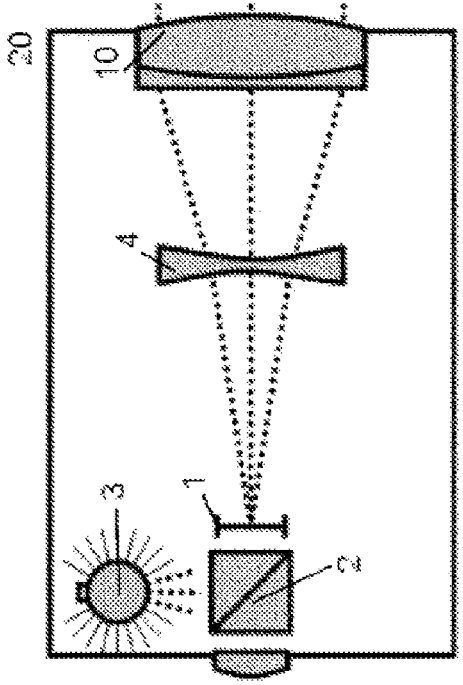
Figure 9B:
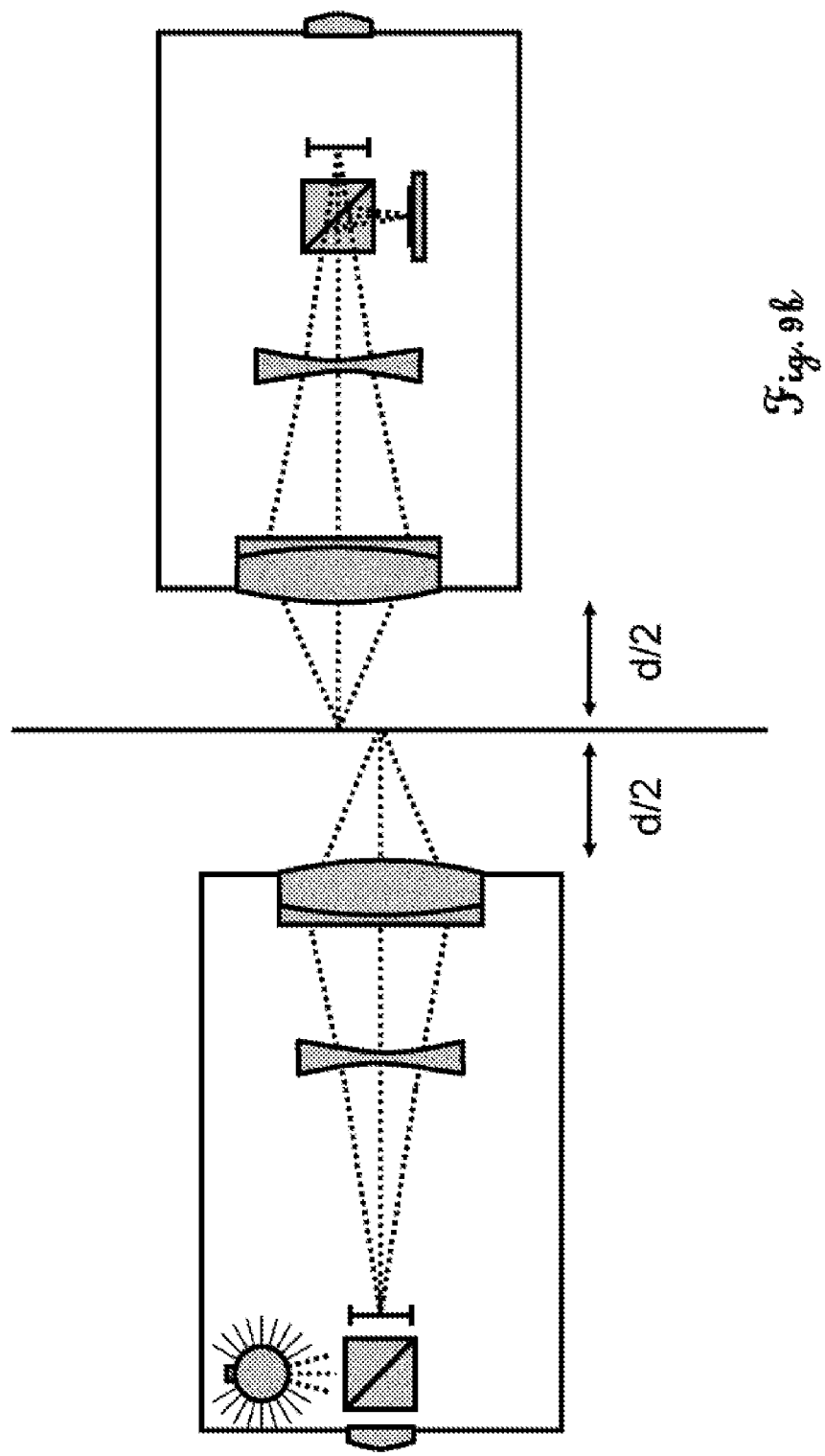
Figure 10:
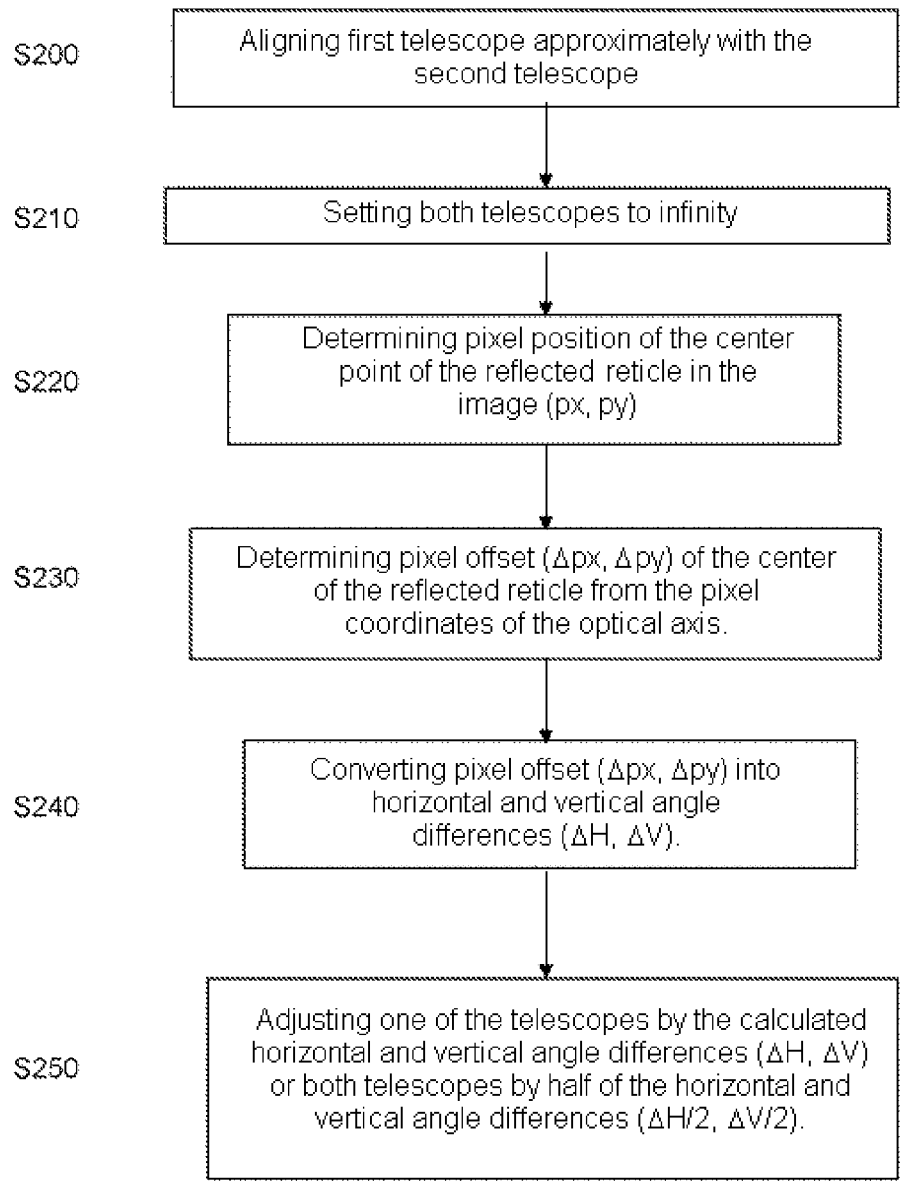
FIG. 10 shows a flowchart of a process for parallel alignment of two telescopes.

A further possibility for application of the automatic autocollimation process according to the invention in the form of stereophotogrammetry is evident from FIGS. 9a/b and 10. This method is used to determine the position and precise form of objects from two measurement images captured e.g. from somewhat different standpoints. In this case, it is possible to determine from what viewing angle (orientation) images are captured. In this case, two instruments are aligned with one another such that the optical axes of their telescopes coincide, as a result of which the alignment of the two instruments can be determined.

As is evident from FIG. 9a, for this purpose, the distal ends of two telescopes 20, 30 are approximately aligned with one another. This corresponds to S200 in FIG. 10. As in the embodiments described previously, the first telescope 20 comprises at least the illumination device 3, the beam splitter 2, the illuminatable reticle 1, the displaceable focus lens 4 and the converging lens 10.

The second telescope 30 likewise comprises a converging lens 10 and a displaceable focus lens 4. Moreover, a second beam splitter 7 is arranged in the second telescope 30, said second beam splitter being designed to deflect light beams incident from outside along the optical axis of the second telescope 30 to an image sensor of an on axis camera 8. In this case, the arrangement of the beam splitter 7 and of the image sensor corresponds to that of the telescope shown in FIG. 4. A reticle 15 is situated between the second beam splitter 7 of the second telescope 30 and the proximal end thereof. As an alternative to the minimum development stage of the two telescopes 20 and 30 as illustrated here, it is also possible to use two telescopes that are fully developed in each case, e.g. in each case according to FIG. 4 or according to FIG. 8.

After the setting of the focus lenses 4 of both telescopes 20 and 30 to infinity (S210 in FIG. 10), the light beams 5 emitted by the first telescope are focused by a converging lens 10 of the second telescope and deflected via the second beam splitter 7 to the image sensor 8. The subsequent processing of steps 220 to 240 corresponds to steps 120 to 140 described with reference to FIGS. 5 and 7.

In the next step for parallel alignment of the two telescopes 20 and 30, one of the two telescopes is adjusted by the calculated angle differences $\Delta H$ and $\Delta V$, or both telescopes 20, 30 are adjusted by half the angle differences $\Delta H/2$ and $\Delta V/2$. By means of this procedure, the two optical axes can be aligned parallel to one another.

If the distance between the two telescopes is known or if it is measured, then the two optical axes can be brought to congruence e.g. by means of the procedure described in greater detail hereinafter. Both telescopes are focused—manually or in a motorized manner—at half the distance d/2 between the telescopes (in this respect, see the exemplary illustration from FIG. 9b, which differs from the illustration from FIG. 9a only with regard to the focus positions of the two telescopes). Therefore, the optical beams are no longer parallel but rather focused onto the object plane at half the distance. The two reticles are superimposed in the object plane and the horizontal and vertical offsets can in turn be calculated by means of image processing. The pixel offset is converted into angle differences ($\Delta H$ and $\Delta V$), and the two telescopes are adjusted in each case by the half of the horizontal and vertical angle differences ($\Delta H/2$ and $\Delta V/2$). Both optical axes are thus brought to correspondence. In order to increase the accuracy, the process can in turn also be carried out iteratively—analogously to the iterative procedure during the autocollimation of a telescope with respect to a mirror as described in detail previously.

During the alignment of the two telescopes 20, 30, the acquired images are identical to the images illustrated in FIGS. 6a to 6d.

The following modifications of the exemplary embodiments are likewise possible. Instead of an illuminated reticle and the corresponding light beams, according to the invention a collimated laser beam can also be used, which is emitted parallel to or ideally along the optical axis of a telescope. The laser beam is reflected from the autocollimation target. On the basis of the difference in the position of the reflected laser beam with respect to the optical axis or with respect to the emitted laser beam, the inclination and the orientation of the autocollimation target are then determined.

If the emitted laser beam is not parallel to the optical axis of the telescope or does not coincide therewith, the deviation must be determined by means of a preceding calibration and then taken into account when determining the angle differences.

The invention has been described on the basis of currently preferred exemplary embodiments, but it is pointed out that the scope of protection is determined solely by the appended claims.

It should once again explicitly be pointed out that the designation of the activities of the method according to the invention that are defined in the figures and claims as steps S100 to S250 and steps a), b), etc. in no way demands or implies that these activities are carried out in a manner that necessarily has to be effected separately. Moreover, the naming of the steps with S100, S110, S120, . . . , S200, S210, etc. and a), b), c), etc. does not necessarily demand a specific order for carrying out the activities. By contrast, in the context of the method according to the invention, the activities designated as steps can also be carried out in combination and/or collectively (that is to say jointly, simultaneously or partly with a temporal overlap). Moreover, the activities of the method that are effected according to the invention (which are designated as "steps" here merely for administrative reasons) can also be carried out in a different order than that arranged above. For example, it is possible for instance—as is clear to the person skilled in the art—to effect the setting of the focusing element of the telescope to infinity either before, after or during (that is to say jointly with) the performance of the step of aligning the telescope with the autocollimation target (or else in part with a temporal overlap).

It goes without saying, moreover, that these illustrated figures only schematically illustrate possible exemplary embodiments. The different approaches can likewise be combined with one another and with methods from the prior art.

What is claimed is:

1. A method for determining a spatial alignment of an autocollimation target having a reflective surface, with a telescope of a robotic surveying instrument, said telescope defining an optical axis, wherein the surveying instrument has a base and an upper part mounted on the base in a manner rotatable about a rotation axis in a motorized manner, and wherein the telescope is mounted on the upper part in a manner pivotable about a pivoting axis in a motorized manner, the method comprising:
    a) aligning the telescope with the autocollimation target;
    b) illuminating a reticle in the telescope, in particular wherein at least one region directly surrounding the reticle is illuminated substantially uniformly;
    c) focusing the telescope at infinity;
    d) acquiring a mirror image, generated at the reflective surface, of the illuminated reticle using an electronic image acquisition device arranged in the telescope;
    e) determining the reticle center point of the acquired mirror image of the illuminated reticle in the image;
    f) determining the horizontal and the vertical distance of the reticle center point from a predetermined pixel position, in particular the pixel position of the optical axis, in the image; and
    g) converting the horizontal and the vertical distance of the reticle center point into a horizontal and a vertical deviation angle of the current alignment of the telescope from an alignment of the telescope that is perpendicular to the reflective surface of the autocollimation target.

2. The method as claimed in claim 1, further comprising:
    performing autocollimation to align the telescope in such a way that the optical axis is perpendicular to the reflective surface of the autocollimation target, including:
        performing motorized movement of the telescope relative to the base depending on the horizontal and the vertical deviation angle in such a way that the optical axis is perpendicular to the autocollimation target;
        measuring the horizontal angle and the vertical angle of the autocollimated telescope; and
        calculating the inclination angle and the orientation angle of the autocollimation target from the measured horizontal angle and vertical angle.

3. The method as claimed in claim 2, wherein:
    performing motorized movement comprises:
        moving the telescope by substantially half of the horizontal and of the vertical deviation angle; and
        acts d), e), f) and g) and moving the telescope are iteratively performed manner until the horizontal and the vertical deviation angles lie below a predetermined threshold value.

4. The method as claimed in claim 2, wherein the predetermined pixel position corresponds to the image center point and/or the determination of the horizontal and of the vertical distance of the reticle center point from the predetermined pixel position in the image is determined from the number of pixels between the reticle center point and the optical axis.

5. The method as claims in claim 2, wherein acts a), c) and d) are effected by automatically tracing a predetermined search pattern by an automatic rotation of the telescope, wherein a focus lens is automatically focused at infinity or brought into focus and the autocollimation target is identified by a comparison of the acquired image with a predefined comparison image.

6. A method for determining a mutual spatial alignment of a first telescope of a first surveying instrument, said first telescope defining a first optical axis, relative to a second telescope of a second surveying instrument, said second telescope defining a second optical axis, wherein the first and second surveying instruments each have a base and an upper part mounted on the base in a manner rotatable about a rotation axis in a motorized manner and the first and second telescopes, respectively, are mounted on the respective upper part in a manner pivotable about a pivoting axis in a motorized manner, the method comprising:
    a) coarsely aligning the first and second telescopes in such a way that the telescopes face one another;
    b) illuminating a reticle in the first telescope, with a substantially uniform illumination of a region encompassing the reticle;
    c) focusing the first and second telescopes at infinity;

d) acquiring the illuminated reticle by using an electronic image acquisition device arranged in the second telescope;
e) determining the reticle center point of the acquired reticle in the image;
f) determining the horizontal and the vertical distance of the reticle center point from a predetermined pixel position;
g) converting the horizontal and the vertical distance of the reticle center point into a horizontal and a vertical deviation angle:
   from the current mutual alignment of the first and second telescopes relative to one another;
   to a mutual alignment of the first and second telescopes in such a way that the first and second optical axes run coaxially with respect to one another; and
k) determining the mutual spatial alignment of the first and second telescopes relative to one another on the basis of the horizontal and the vertical deviation angle.

7. The method as claimed in claim 6, further comprising:
performing autocollimation to align the first telescope relative to the second telescope in such a way that the first and second optical axes run coaxially with respect to one another, including:
   performing motorized movement of the first and second telescopes relative to the base depending on the horizontal and the vertical deviation angle in such a way that the first and second optical axes run coaxially with respect to one another, wherein both the first and the second telescope are moved in a motorized manner by respectively half the horizontal and half the vertical deviation angle;
   measuring the horizontal angle and the vertical angle of the first telescope and of the horizontal angle and of the vertical angle of the second telescope, and
   calculating the mutual spatial alignment from the measured horizontal and vertical angles.

8. A robotic surveying instrument, for use in the context of a method for determining a spatial alignment of an autocollimation target, the robotic surveying instrument comprising:
   a base;
   an upper part mounted on the base in a manner rotatable about a rotation axis in a motorized manner;
   an evaluation and control unit; and
   a telescope mounted on the upper part in a manner pivotable about a pivoting axis in a motorized manner, said telescope defining an optical axis, wherein the telescope includes:
      a light source;
      a reticle, which can be illuminated by the light source, in particular wherein the light source and the reticle are embodied and arranged relatively in such a way that at least one region directly surrounding the reticle is illuminated substantially uniformly;
      a first beam splitter, which is arranged at a proximal end of the telescope, in order to deflect light beams emitted by the light source along the optical axis of the telescope; and
      a focus lens, which is movable along the optical axis and allows to focus the telescope at infinity,
   wherein the telescope includes a coaxial image acquisition device for acquiring an image from a mirror image of the illuminated reticle, said mirror image being generated at a reflective surface of the autocollimation target, and the evaluation and control unit is designed for
   determining the reticle center point of the acquired mirror image of the illuminated reticle in the image;
   determining the horizontal and the vertical distance of the reticle center point from a predetermined pixel position, in particular the pixel position of the optical axis, in the image; and
   converting the horizontal and the vertical distance of the reticle center point into a horizontal and a vertical deviation angle of the current alignment of the telescope from an alignment of the telescope that is perpendicular to the reflective surface of the autocollimation target.

9. The robotic surveying instrument as claimed in claim 8, wherein the evaluation and control unit operates such that the robotic surveying instrument has a collimation target alignment determining or autocollimation functionality which proceeds at least partly automatically after initiation.

10. The surveying instrument as claimed in claim 8, wherein a second beam splitter for coupling a secondary beam path of the image acquisition device into a main beam path of the telescope is provided between the first beam splitter and the movable focus lens.

11. The surveying instrument as claimed in claim 10, wherein the illuminable reticle is arranged in the main beam path between the first beam splitter and the movable focus lens and/or between the first beam splitter and the second beam splitter.

12. The surveying instrument as claimed in claim 8, wherein the illuminable reticle is arranged between the light source and the first beam splitter, and a second reticle is arranged in the main beam path between the proximal end of the telescope and the first beam splitter.

13. The surveying instrument as claimed in claim 8, wherein the illuminable reticle is embodied asymmetrically, in such a way that:
   the illuminable reticle in the image together with its mirroring about the horizontal and/or the vertical axis complement one another to form a symmetrical overall arrangement; or
   the second reticle in the image together with a mirroring of the illuminable reticle about the horizontal and/or the vertical axis complement one another to form a symmetrical overall arrangement.

14. A surveying system comprising a first and a second robotic surveying instrument, for use in the context of a method for determining a mutual spatial alignment of a first telescope of a first surveying instrument, said first telescope defining a first optical axis, relative to a second telescope of a second surveying instrument, wherein:
   the first robotic surveying instrument includes:
      a base;
      an upper part mounted on the base in a manner rotatable about a rotation axis in a motorized manner; and
      a first telescope mounted on the upper part in a manner pivotable about a pivoting axis in a motorized manner, said first telescope defining a first optical axis, including:
         a light source;
         a reticle, which can be illuminated by the light source, in particular wherein the light source and the reticle are embodied and arranged relatively in such a way that at least one region directly surrounding the reticle is illuminated substantially uniformly;
         a first beam splitter, which is arranged at a proximal end of the telescope, in order to deflect light beams emitted by the light source along the optical axis of the telescope; and
         a focus lens, which is movable along the optical axis; and allows to focus the first telescope at infinity, and the second robotic surveying instrument includes:
  a base;
  an upper part mounted on the base in a manner rotatable about a rotation axis in a motorized manner; and
  a second telescope mounted on the upper part in a manner pivotable about a pivoting axis in a motorized manner, said second telescope defining a second optical axis; including:
    a focus lens, which is movable to and fro along the optical axis and allows to focus the first telescope at infinity, wherein:
      a coaxial image acquisition device for acquiring an image of the illuminated reticle, this device being provided in the second telescope; and
      an evaluation and control unit that operates such that the surveying system has a functionality, proceeding at least partly automatically after initiation, for
        determining the horizontal and the vertical distance of the reticle center point from a predetermined pixel position,
        converting the horizontal and a vertical deviation angle;
      from the current mutual alignment of the first and second telescopes relative to one another;
      to a mutual alignment of the first and second telescopes in such a way that the first and second optical axes run coaxially with respect to one another; and
      determining the mutual spatial alignment of the first and second telescopes relative to one another or for the mutual autocollimation of the first and second telescopes relative to one another on the basis of the horizontal and the vertical deviation angle.

* * * * *